United States Patent [19]

Churchill et al.

[11] Patent Number: 5,237,883
[45] Date of Patent: Aug. 24, 1993

[54] POWER TAKE-OFF DEVICES

[75] Inventors: Stephen J. Churchill, Basildon; Michael E. Langford, Billericay; John G. Appleton, Hullbridge; Alvin J. Budd, South Woodham Ferreys; Michael P. Rodgers, Ingateston, all of England

[73] Assignee: Ford New Holland, Inc., New Holland, Pa.

[21] Appl. No.: 891,377

[22] Filed: May 29, 1992

[30] Foreign Application Priority Data

Jun. 1, 1991 [GB] United Kingdom ............. 9111811.7

[51] Int. Cl.5 ............................................. B60K 17/28
[52] U.S. Cl. ...................................... 74/11; 180/53.6; 180/271
[58] Field of Search ................ 74/11; 180/53.6, 53.61, 180/53.7, 271, 272, 282

[56] References Cited

FOREIGN PATENT DOCUMENTS 2156754 10/1985 United Kingdom ............. 180/53.61

Primary Examiner—Allan D. Herrmann
Assistant Examiner—William B. Trousdell
Attorney, Agent, or Firm—Larry W. Miller; Frank A. Seemar

[57] ABSTRACT

An apparatus fitted with a power take-off (PTO) drive connectable to ancillary equipment and means for actuating and deactuating the PTO drive is disclosed wherein an interlock system includes sensor means for sensing whether the PTO drive is operative and producing an output signal representative thereof, timer means coupled to the actuating and deactuating means and initiated when said means is operated, and means responsive to the sensor output signal and coupled to timer means and operable to produce a deactuating signal if the sensor output signal is of a predetermined nature when the timer times out. The deactuating signal is applied to a selected component of the apparatus to deactuate that component.

13 Claims, 10 Drawing Sheets

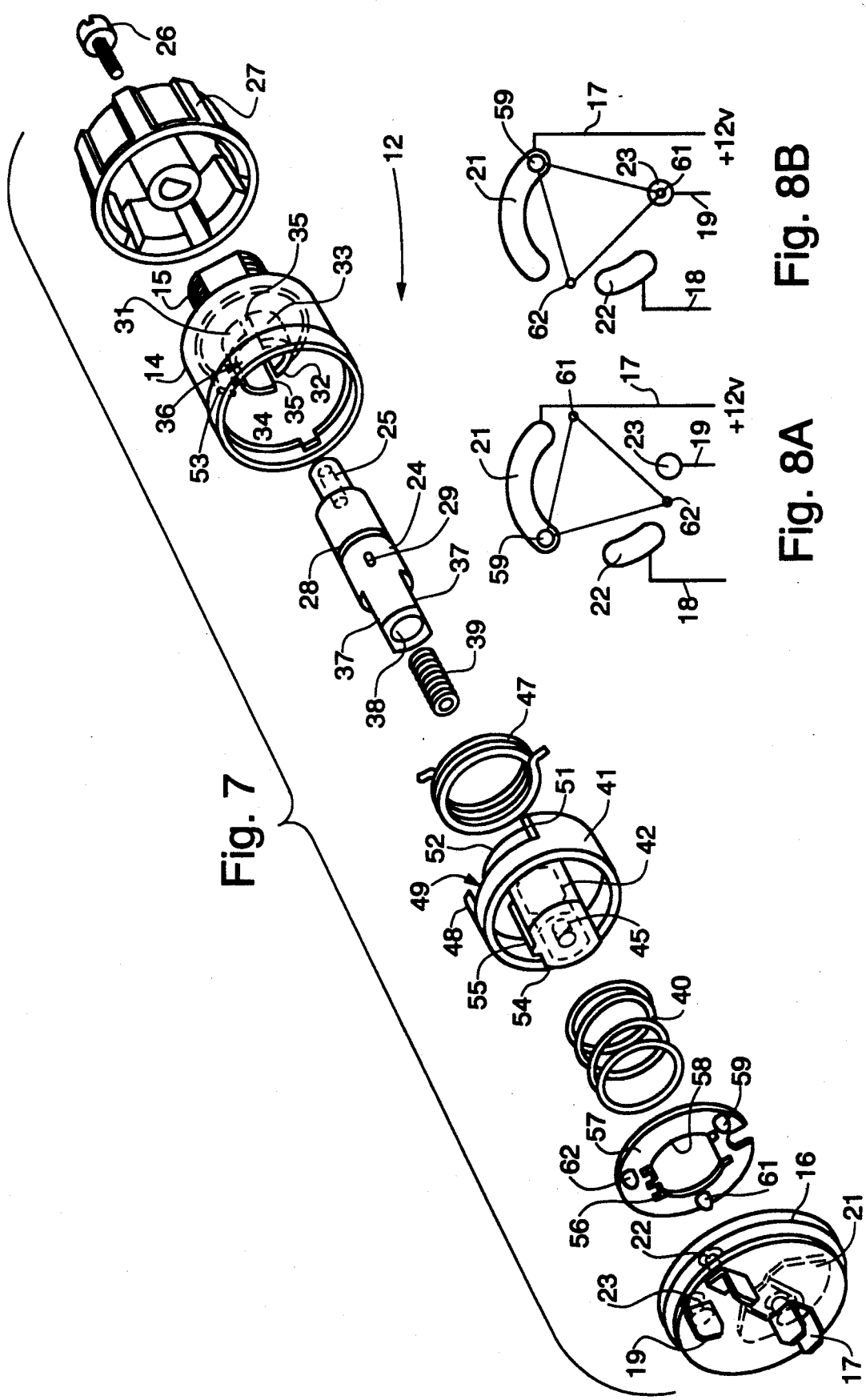

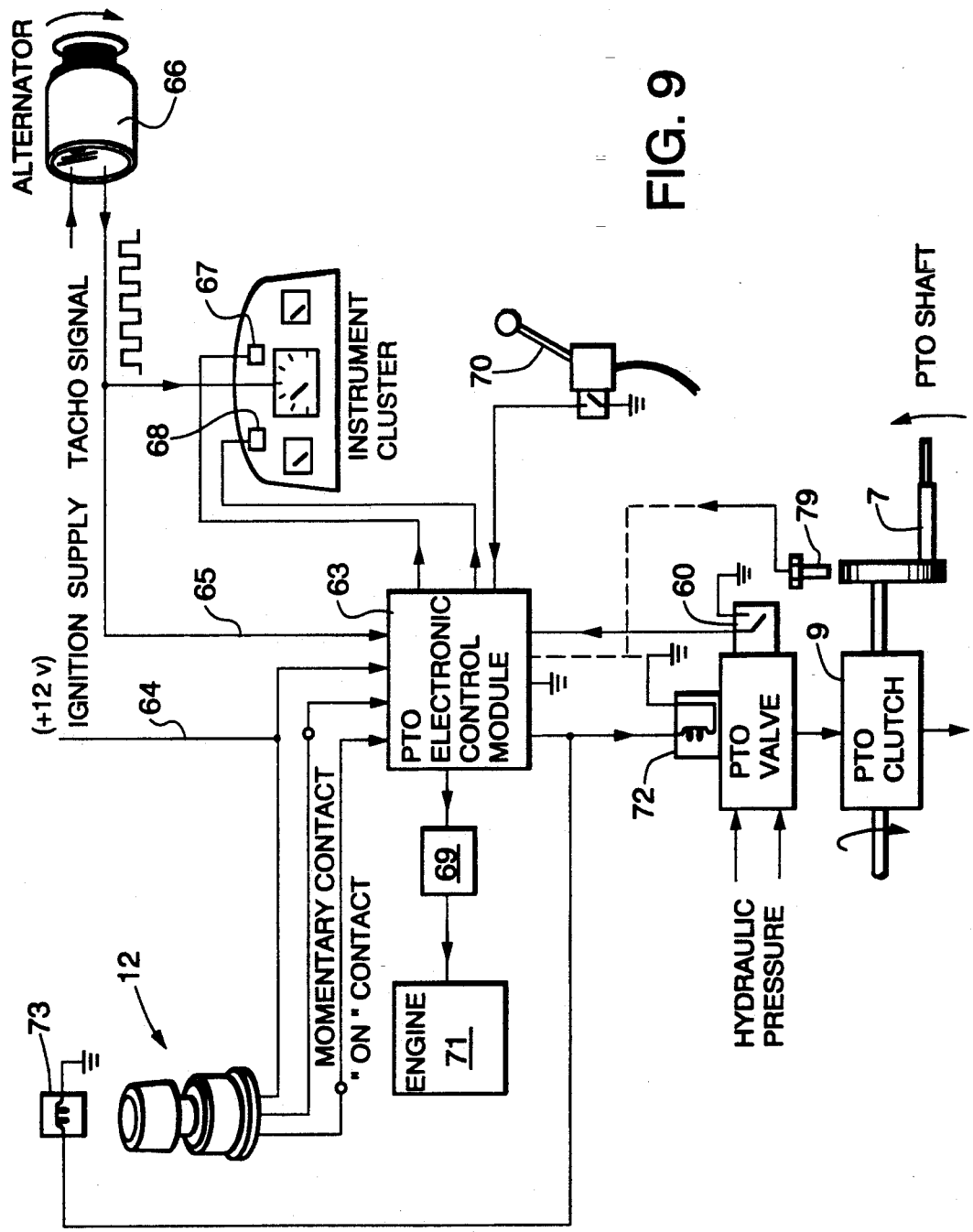

POWER TAKE-OFF DEVICES

BACKGROUND OF THE INVENTION

This invention relates to power take-off (PTO) devices and has been conceived in connection with the PTO of an agricultural tractor but it is understood that the invention is applicable to any apparatus having a PTO arrangement.

The PTO of a tractor typically comprises an output shaft of the tractor gearbox, which shaft may be rearwardly directed so as to be readily coupled to an ancillary piece of equipment, such as a baler or forage harvester, for example, the coupling in some cases being by way of a shaft mounted in a cylindrical housing and connected at one end to the PTO shaft via a universal joint, and coupled at the other end to the ancillary equipment, again via a universal joint. The basic coupling is protected by some form of shielding for safety reasons. This still remains a potentially hazardous component, as does the PTO shaft itself if it is left uncovered. The PTO shaft of a tractor is typically driven at 1,000 rpm and even in a two-speed arrangement, the lower speed is still to be between 500 and 700 rpm so that in either event, if any of the rotating elements are touched or if loose clothing is caught therein, this can result in very serious, if not fatal, injuries. Also, an untimely and unexpected engagement of the drive to the ancillary equipment is potentially very hazardous.

SUMMARY OF THE INVENTION

The object of the present invention is to provide a PTO device which has improved safety features.

The present invention is defined in the appended claims and provides, according to one aspect, in an apparatus fitted with a power take-off (PTO) drive connectable to ancillary equipment and means for actuating and deactuating the PTO drive, an interlock system comprising sensor means for sensing whether the PTO drive is operative and producing an output signal representative thereof, timer means coupled to the actuating and deactuating means and initiated when said means is operated, and means responsive to the sensor output signal and coupled to the timer means and operable to produce a deactuating signal if the sensor output signal is of a predetermined nature when the timer times out, the deactuating signal being applied to a selected component of the apparatus to deactuate that component.

In accordance with a second aspect, the invention provides in an apparatus fitted with a power take-off PTO drive connectable to ancillary equipment and means for actuating and deactuating the PTO drive, an interlock system comprising sensor means for sensing whether the PTO drive is operative and producing an output signal representative thereof, timer means coupled to the actuating and deactuating means and initiated when the actuating and deactuating means is operated to actuate the PTO drive, and means responsive to the sensor output signal and coupled to the timer and operable to deactuate the actuating and deactuating means if the PTO drive is not operative when the timer times out.

Thus, if the PTO drive is required and is accordingly actuated, the actuation is reversed (i.e. the PTO drive is deactuated) if after a predetermined time, for example 10 seconds, the PTO is not operative. This interlock system ensures that the PTO drive cannot suddenly and unexpectedly be rendered operative which could be highly dangerous if the operator or some other person is investigating why the PTO drive is not operative having been actuated. There are a number of reasons why the PTO drive might be initially inoperative and then suddenly become operative; for example, there may be a temporary overload on the ancillary equipment to which the PTO is connected which is removed wittingly or unwittingly, or a clutch mechanism for the PTO drive may suddenly become operative. In the context of an agricultural tractor, it is common to control the PTO drive through a fluid clutch and thus this PTO actuating and deactuating means may be controlled by supplying, or interrupting, as appropriate, current to a solenoid valve controlling the flow of fluid to the fluid clutch. It could happen that even though the solenoid valve is energised, the spool of the valve is stuck, whereby fluid is not allowed to pass to the clutch. However, due to vibration, for example, the spool may be freed, whereby the clutch will suddenly be rendered operative which, as indicated, could be highly dangerous.

According to a third aspect of the invention, there is provided in an apparatus fitted with a power take-off (PTO) drive drivable by primary drive means for the apparatus and connectable to ancillary equipment, and means for actuating and deactuating the PTO drive, an interlock system comprising sensor means for sensing whether the PTO drive is operative and producing an output signal representative thereof, timer means coupled to the actuating and deactuating means and initiated when the actuating and deactuating means is operated to deactuate the PTO drive, and means responsive to the sensor output signal and coupled to the timer means and operable to deactuate the primary drive if the PTO drive is still operative when the timer times out.

With this interlock system, steps are taken to render a primary drive of the apparatus inoperative should the PTO drive remain operative following deactuation thereof. In the context of an agricultural tractor as discussed above in accordance with the second aspect of the invention, it could be that the spool of the solenoid valve sticks in the ON position, whereby the PTO drive continues to be operative even though current to the controlling solenoid has been interrupted. As it is dangerous for the PTO drive and ancillary equipment to be operated when not required, then steps are taken to render the engine of the tractor inoperative, for example by interrupting the fuel supply to the engine. Preferably, indicator means are also rendered operative in the cab of the tractor so as to indicate to the operator that there is a problem with the PTO drive although conveniently, the operator is allowed to restart the engine and take steps to correct the error in the PTO drive system, it not being practical to render the tractor entirely inoperative due to this fault in case at the time, the tractor is in a remote or unsuitable location.

According to a fourth aspect of the present invention there is provided in an apparatus fitted with a power take-off (PTO) drive drivable by primary drive means for the apparatus and connectable to ancillary equipment, means for actuating and deactuating the PTO drive and switch means for controlling the actuating and deactuating means, an interlock system, characterised in that the system comprises first sensor means for sensing whether the primary drive means is operative and producing a first output signal representative thereof, second sensor means for sensing whether the PTO drive is operative and producing a second output signal representative thereof, means responsive to the first and second signals and operable to deactuate the PTO drive via the actuating and deactuating means when the second signal is present and the first signal is absent, i.e. when the primary drive means is inoperative and the switch means is in the ON position.

Preferably, means is provided for maintaining the PTO drive deactuated until the switch means 12 is first moved to the OFF position and then moved to the ON position.

According to this aspect of the invention, the PTO drive is automatically deactuated if the PTO control switch is still in the ON position when the primary drive means is rendered inoperative, whereby the potentially hazardous situation of the PTO drive being rendered operative, together with any connected ancillary equipment, when the primary drive means is next rendered operative is avoided. The fact that the PTO switch preferably has to be moved to OFF then ON whilst the primary drive is operative before the PTO can next be engaged is a relatively simple but effective procedure, thus avoiding the complexities of known ignition/PTO interlocks for tractors, for example.

It is common practice for the PTO drive initiation to involve at least two distinct operations in order to ensure that the PTO drive is not engaged accidentally. However, there has not been any interlock between these two operations which means that an operator could carry out the first operation be interrupted in his task and then either the same or a different operator could accidentally carry out the second operation, thus rendering the PTO drive operative when not actually required.

According to a fifth aspect of the present invention, there is provided in an apparatus fitted with a power take-off (PTO) drive connectable to ancillary equipment and means for initiating the actuation and deactuation of the PTO drive, the initiation means requiring distinct first and second movements of actuation to render the PTO drive operative, an interlock system comprising timer means initiated when a first signal denoting intended actuation of the PTO drive is detected, means coupled to the timer means and responsive to a second signal confirming intended actuation of the PTO and operable to deactuate the PTO drive if the timer means times out before said second signal is detected.

Thus, in accordance with this aspect of the invention, the PTO drive cannot be rendered operative unless the first and second signals have been detected within a predetermined time limit, thereby avoiding a potentially hazardous situation which could arise if the second signal can be generated independently of the first.

It is preferable for the first and second signals to be generated as a result of two different movements of PTO drive initiation so that a conscious effort has to be made by the operator to complete initiation, and according to a fifth aspect of the present invention, there is provided means for initiating a power take-off (PTO) drive comprising electrical switch means, an operating member for the switch means having first to be subjected to one type of movement and then subjected to a second type of movement, different from the first, in order to complete actuation of the switch to render the PTO drive operative. The first movement may be a linear movement and the second movement may be a rotary movement.

Although it is desirable for the operator to be forced to make a conscious effort in order to render the PTO drive operative, it is desirable that he should be able to deactuate that drive quickly in the event of an emergency. Accordingly, according to a preferred feature of this aspect of the invention, the switch means can be deactuated by striking the operating member although the PTO drive can be rendered inoperative by reversing the movements of the operating member.

BRIEF DESCRIPTION OF THE DRAWINGS

An agricultural tractor embodying the various aspects of the present invention will now be described in greater detail, by way of example, with reference to the accompanying drawings in which:

FIG. 7 is an exploded view of the switch of FIG. 4;

FIGS. 8A and 8B are diagrams useful in explaining the operation of the switch of FIG. 4;

FIG. 9 is a partly illustrated block diagram of the control system for the PTO of the tractor;

DETAILED DESCRIPTION OF THE PREFERRED EMBODIMENT

The various aspects of the present invention are illustrated in this embodiment by reference to an agricultural tractor but it is to be understood that the invention is applicable to any apparatus having a PTO drive.

Figure 1:
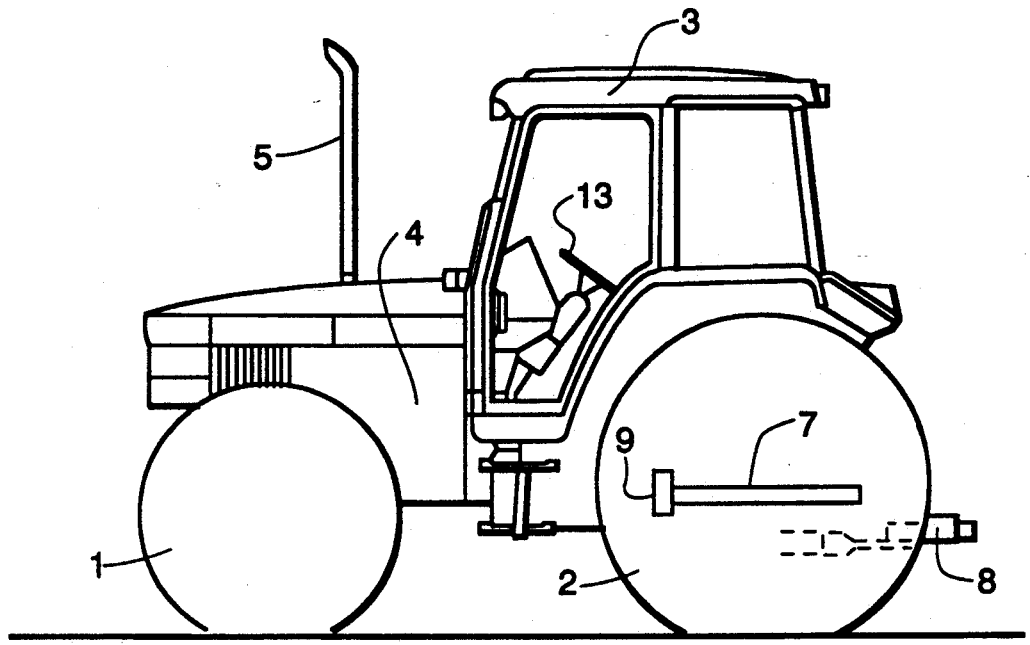
FIG. 1 is a diagrammatic side view of the tractor.
Figure 2:
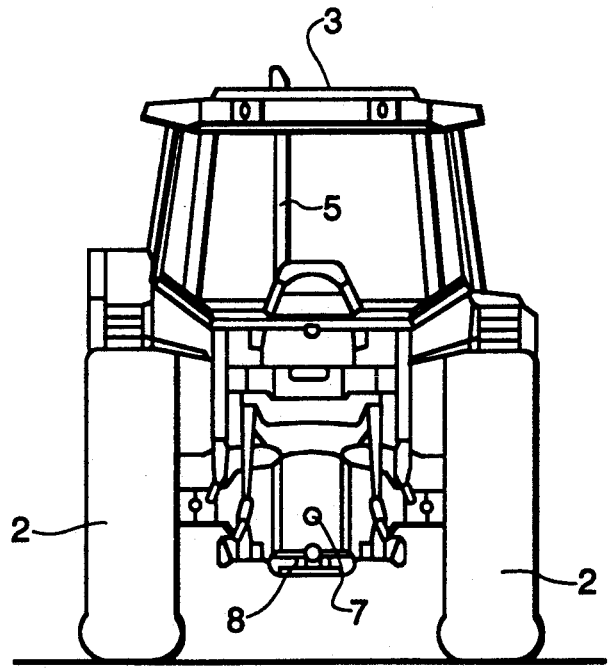
FIG. 2 is a rear view of the tractor of FIG. 1.
Figure 3:
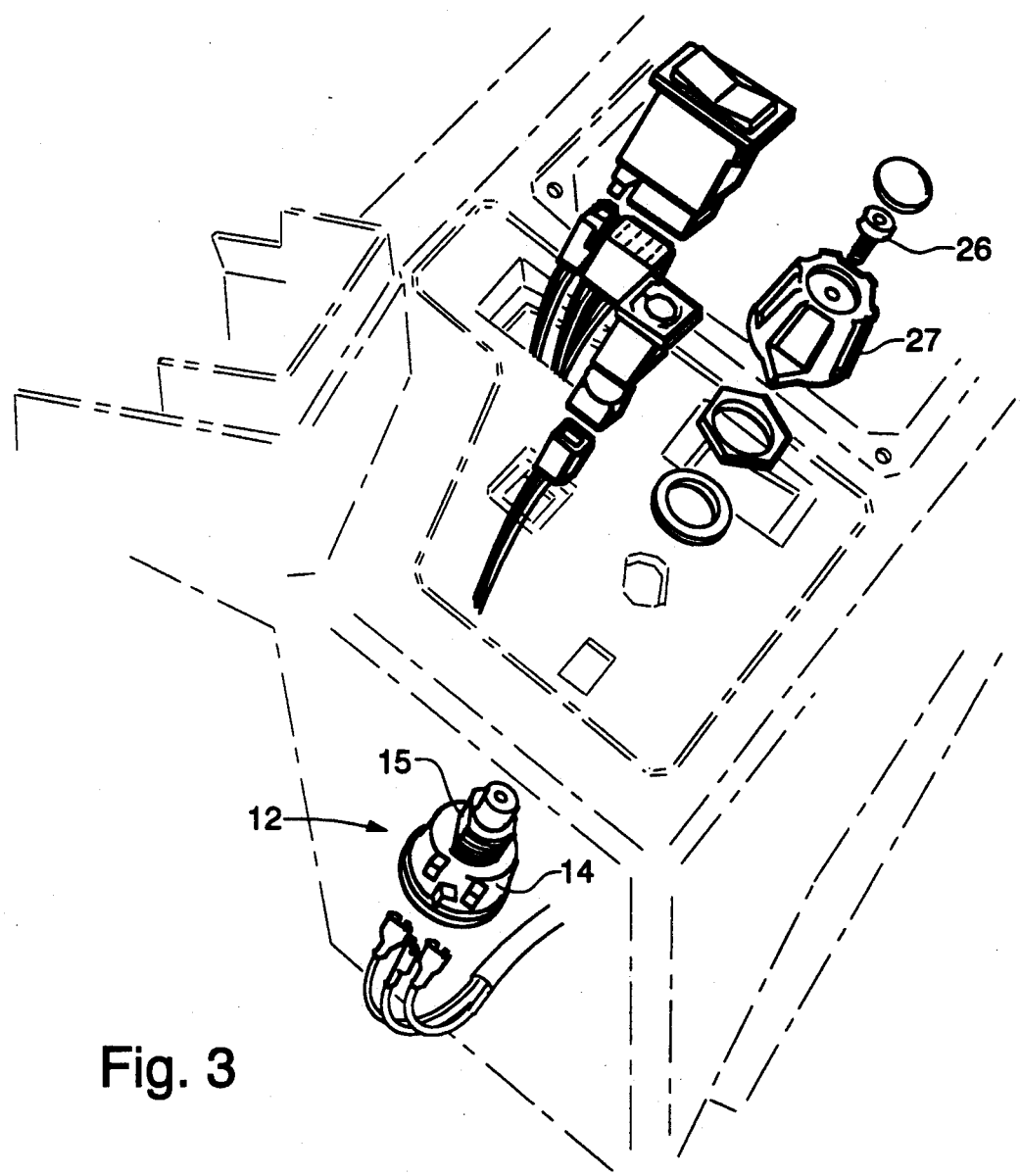
FIG. 3 is a perspective, and exploded view, of controls mounted within the tractor cab.
Figure 6:
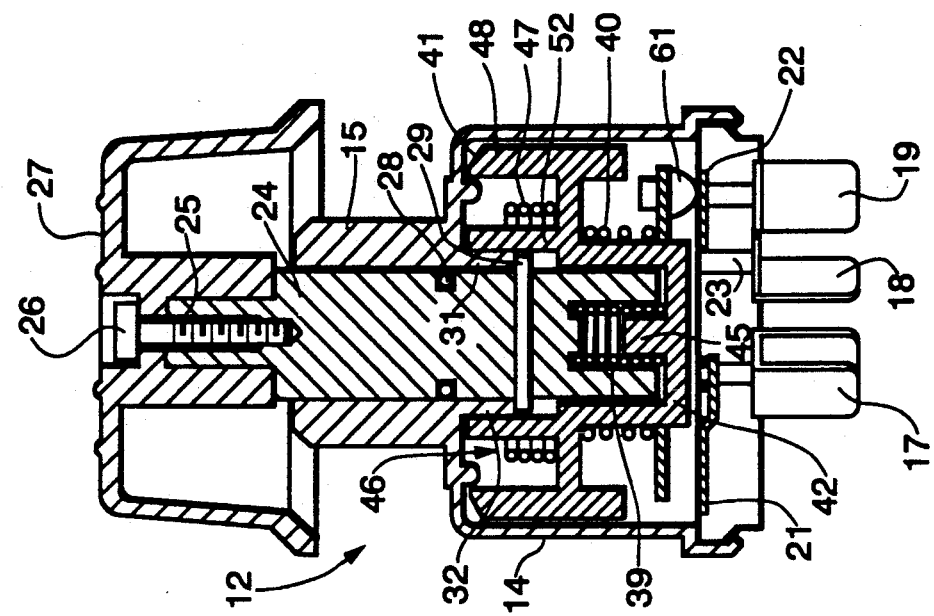
FIG. 5 and 6 are cross-sectional views, to a larger scale of the switch of FIG. 4 in an OFF position and a partly-actuated position, respectively.
Figure 4:
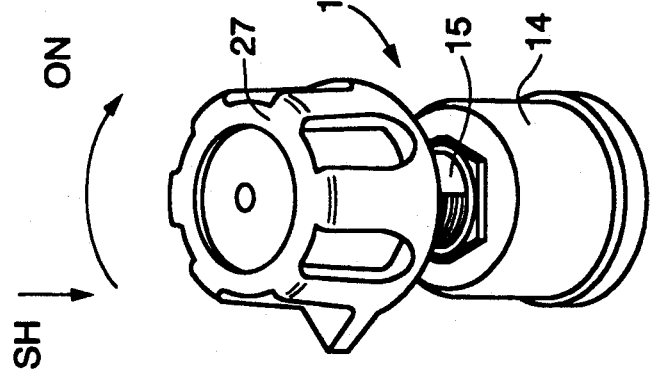
FIG. 4 is a perspective view, to a larger scale, of a control switch of FIG. 3.
Figure 5:
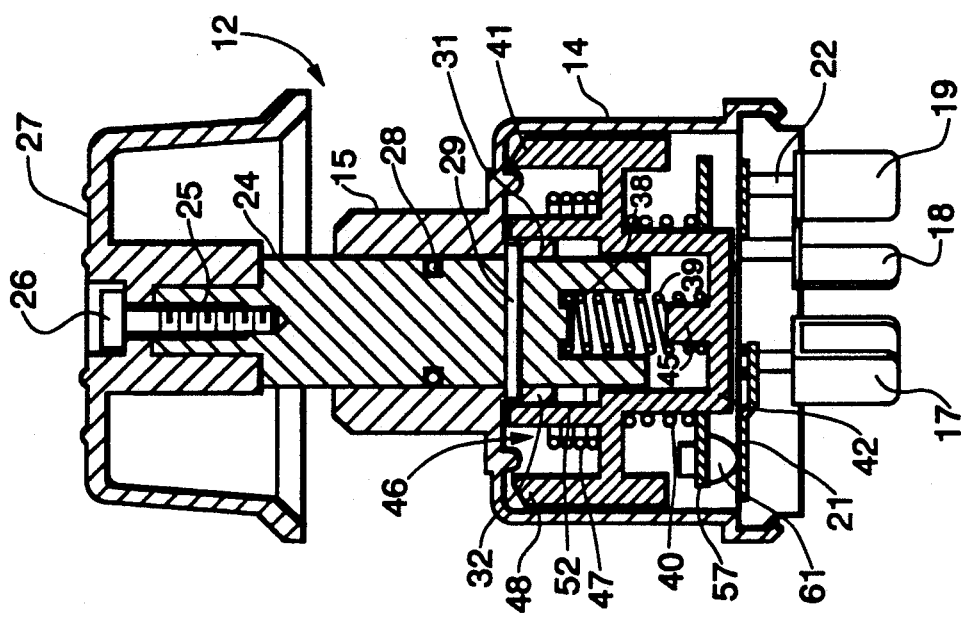

Referring to the accompanying drawings, the tractor has a pair of front, steerable, ground-engaging wheels 1, a pair of rear, driven, ground-engaging wheels 2, and a cab 3 mounted on a basic frame or chassis (not seen) of the tractor, the engine (not seen in FIGS. 1 and 2 but schematically shown at 71 in FIGS. 9 and 10) is mounted within an engine compartment 4 at the front of the tractor, the exhaust pipe 5 being seen in FIGS. 1 and 2 of the drawings. The engine 71 drives, via a transmission, a gearbox (not seen) mounted towards the rear of the tractor and having two output shafts, one of which drives the rear axle on which the rear wheels 2 are mounted, and the other of which provides a power take-off (PTO) shaft 7. A towing hitch 8 is also provided at the rear of the tractor to which is connectable ancillary equipment, such as a baler or forage harvester, for example, the drivable components of this ancillary equipment being driven via the PTO shaft 7. To this end, a conventional drive line is provided which comprises universal joints and which is connected at one end to the PTO shaft 7 and at the other end to an input shaft of the ancillary equipment from which the various components of that equipment are driven.

The PTO shaft 7 is driven from the engine transmission via a fluid clutch 9 which is controlled, in a conventional manner, by a solenoid-controlled hydraulic valve 11. Energising current is supplied to the solenoid 72 (FIG. 9) of the valve 11 via an actuating/deactuating electrical switch 12 mounted in the cab 3 to the right-hand side, and slightly rearwardly of, the steering wheel 13. The valve 11 is fitted with a sensor 14 which senses the pressure of the fluid in the clutch.

The switch 12 is shown in greater detail in FIGS. 4 to 8 to which reference will now be made. The switch 12 comprises a generally cylindrical housing 14 closed at one end and provided at that closed end with a threaded boss 15 by which the switch is mounted in the cab 3. The housing 14 is closed by a base plate 16 which carries three electrical terminals 17,18 and 19 on its outer side, which terminals are connected to respective contacts 21,22 and 23 on the opposite face of the base plate. The boss 15 is hollow and receives therein one end of a shaft 24 which has an internally threaded aperture 25 to receive a screw or bolt 26 which passes through a knob 27 to secure the latter to the shaft 24.

An O-ring seal 28 is fitted generally centrally of the shaft 24 and a diametral pin 29 is provided, both ends of the pin extending from the body of the shaft. Within the housing 14 there are provided four spaced segments 31,32,33 and 34 disposed in diametrically opposed pairs 31,32 and 33,34. The spacing between the segments 31 to 34 is such as to provide two diametral, and axially extending, slots 35 and 36 disposed generally 90° apart and which receive, as a sliding fit, the ends of the pin 29. When the pin 29 engages either of the slots 35,36 it cannot be rotated. The opposed pair of segments 31 and 32 have an axial length shorter than the segments 33 and 34 for a purpose to be described. In essence the segments 31-34 are formed from a cylindrical extension on the inside of the housing 14.

The end of the shaft 24 remote from the closed end of the housing 14 is provided with a pair of opposed flats 37 and the end of the shaft has an axial blind bore 38 which receives one end of a compression spring 39. This end of the shaft 24 receives a rotary member 41 having a central, hollow boss portion 42 shaped to receive the end of the shaft 24 having the flats 37, whereby the rotary component is keyed to the shaft for the rotation therewith. The inner end of the hollow boss 42 is provided with an axially-extending peg 45 which locates the other end of the compression spring 39, this spring thus acting between the closed end of the boss 42 and the inner end of the blind bore 38 in the shaft 24.

The rotary member 41 is provided with an annular recess 46 in which sits a torsion spring 47. Part of the periphery of the outer wall 48 defining the annular recess 46 is cut away at 49 and one end of the torsion spring 47 is out-turned so as to engage an edge 51 of the outer wall 48. The inner diameter of the inner wall 52 defining the annular recess 46 is such as to receive the pin 29 as a clearance fit. The other end of the torsion spring 47 engages a tang or axial extension 53 provided on the closed end of the housing 14 as seen in FIG. 7. The exterior shape of the boss 42 is similar to the end of the shaft 24 provided with the flats 37 and on one of the flats 54 of the boss 42 there is provided an axially-extending key or rib 55 which cooperates with a key slot 56 in a contact plate 57 which has a central aperture 58 of a shape complementary to the boss 42, whereby the plate is keyed to, and rotates with, the rotary member 41. The purpose of the rib 55 is to ensure the correct orientation of the contact plate on the boss 42 to ensure the correct positioning of three electrical contacts in the form of pips 59,61 and 62 carried on the face of the contact plate 57 remote from the rotary member 41. A compression spring 40 is located on the boss 42 and acts between the latter and the contact plate 57 to provide electrical contact pressure.

The contact 21 formed on the base plate 16 is of segmental shape and the contact pip 59 is permanently in connection therewith, the associated terminal 17 being connected to the positive terminal of the tractor battery. In the OFF position of the switch 12, the contact 61 is clear of the contact 21 and is positioned between one end thereof and the contact 23, this best being seen in the diagram of FIG. 8A. The contact 23 is engaged by the contact pip 61 in the fully ON position of the switch 12 as shown in FIG. 8B. This contact is achieved by rotary movement of the shaft 24, and hence rotary member 41 and contact plate 57, and in reaching the position in which the contact pip 61 moves over an arc to engage the contact 23, it will be seen from FIGS. 8A and 8B that the contact pip 62 wipes the contact 22 prior to the contact pip 61 contacting the contact 23.

It will be appreciated that actuation of the switch 12 requires two distinct movements, the first being an axial movement which is achieved by depressing the knob 27 which axially moves the shaft 24 against the action of the compression spring 39 and disengages the ends of the pin 29 from the diametral slot 35, whereby the shaft 24 can now rotate over an arc which is defined by adjacent ends of the longer segments 33 and 34. The second distinct movement of actuation of the switch 12 is thus a rotary movement which is obtained by turning the knob 27, while it is depressed, and in so doing, the contact pip 62 on the contact plate 57 wipes the contact 22 on the base plate 16 and thus connects momentarily the positive or live terminal 17 to the terminal 18 which produces a signal which will be discussed hereinafter. On completion of this rotary movement, determined by the ends of the pin 29 engaging the corresponding edges of the longer segments 33 and 34, the contact pip 61 is in engagement with the contact 23 and thus the positive or live terminal 17 is now connected to the terminal 19 and again the signal created thereby is responded to in a manner to be described.

This rotary movement of the shaft 24, member 41 and contact plate 57 results in a loading of the torsional spring 47 by virtue of the fact that one end thereof is held stationary by the tang 53 and the other is moved with the rotary member 41. When the ends of the pin 29 abut against the corresponding edges of the longer segments 33 and 34 and the knob 27 is released by the operator, the previously compressed compression spring 39 automatically moves the shaft 24 in the opposite axial direction, whereby the ends of the pin 29 now engage the alternative diametral slot 36 and is hence again prevented from being rotated. The torsion spring 47 remains loaded.

In order to deactuate or open the switch 12, it is necessary to repeat the two distinct movements of the switch, i.e. first press the knob 27 so as to disengage the ends of the pin 29 from the alternative slot 36 and then rotate the knob in the opposite direction until the ends of the pin 29 engage the other edges of the longer segments 33 and 34 and then releasing the knob, whereupon the compression spring 39 will again move the shaft 24 axially so as to engage the ends of the pin 29 in the original slot 35. However, in order to obtain a very fast deactuation of the switch 12, which might be required in an emergency, all that is necessary is for the operator to strike the knob 27 sufficiently to disengage the ends of the pin 29 from the slot 36, whereupon the loaded torsion spring 47 will automatically rotate the rotary member 41, and hence the contact plate 57 and the shaft 24, until the ends of the pin 29 engage the other edges of the longer segments 33 and 34 and the compression spring 39 will then move the shaft 24 so as to engage the ends of the pin 29 in the original slot 35 as already described. It should be noted that the spring 47 will also return the switch 12 to the OFF position if the knob 27 is released after having been only partially rotated towards the ON position.

Figure 10:
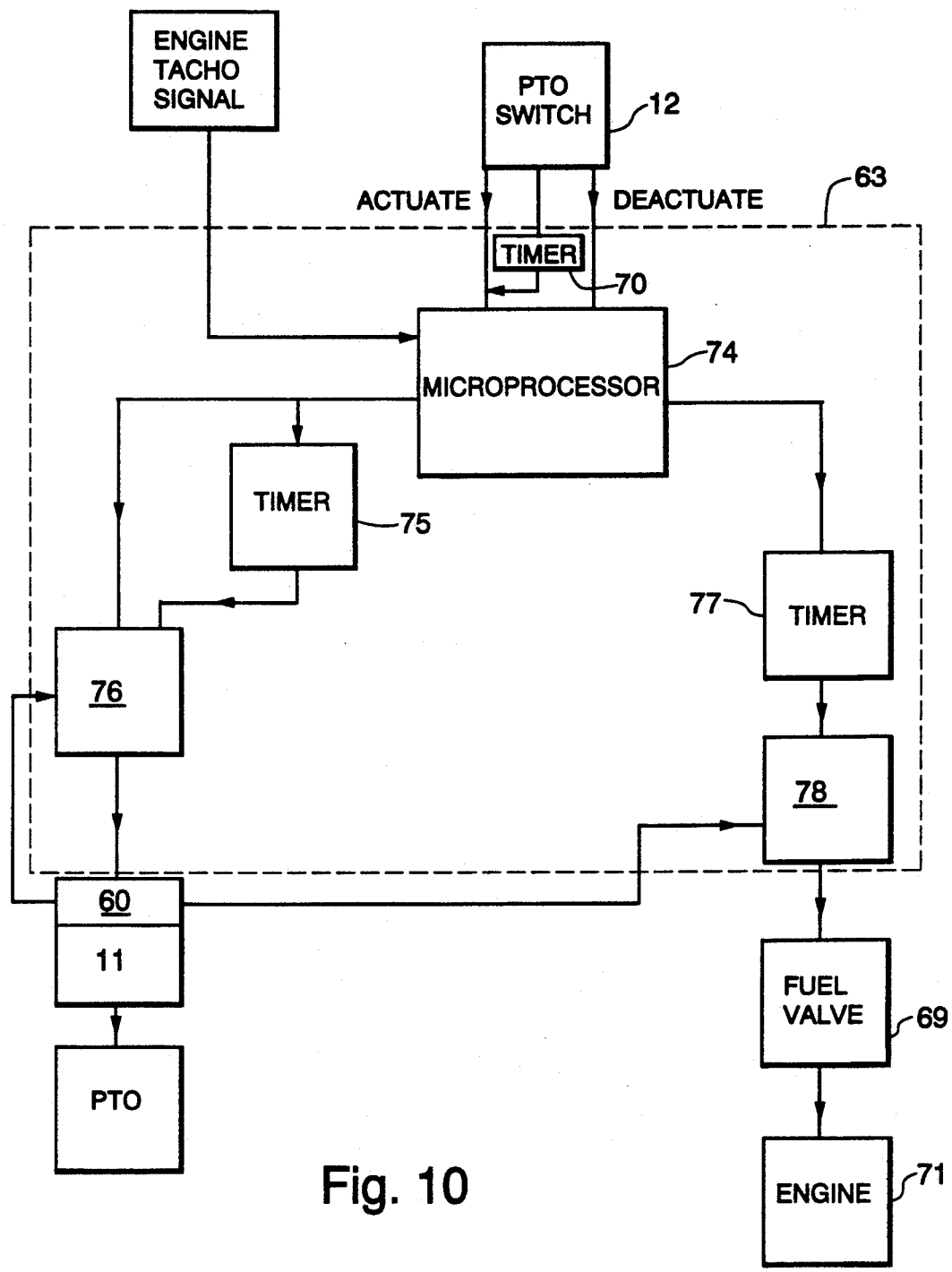
FIG. 10 is a block diagram of part of FIG. 9.

Turning now to FIGS. 9 and 10, the former shows a partly illustrated block diagram of the PTO actuation and control. The PTO switch 12 is connected to a PTO electronic control module 63 which thus receives as inputs a +12 V signal when the switch terminal 17 is connected to the tractor battery via an ignition line 64, a signal when the contact 62 makes wiping contact with the contact 22, and a signal when the contact 61 is in engagement with the contact 23. In addition, the module 63 receives a tachometer signal input on line 65 from an alternator 66 associated with the tractor engine 71. The module 63 also receives as an input a signal from a pressure switch 60 associated with the solenoid-controlled hydraulic valve 11 which controls the actuation of the fluid clutch 9, and a signal from a PTO speed selector 70.

An output of the module 63 is connected to an instrument cluster 50 provided in the cab 3 and more particularly to a lamp 67 which, when energised, indicates that the full speed of the PTO output has been selected by the lever of the speed selector 70, as opposed to a reduced speed. Another output is connected to a lamp 68 which is energised when a system failure occurs, whereby the PTO shaft 7 would continue to be engaged even though disengagement had been intended and initiated. This may happen, for example, when the hydraulic valve 11 sticks in the ON position. A further output from the module 63 is taken to a fluid control valve 69 which is associated with the tractor engine indicated at 71 in FIG. 9. A further output from the module 63 is connected to the solenoid 72 of the hydraulic valve 11, this output also being connected to a lap 73 in the cab 3 which, when energised, indicates to the operator that the PTO has been engaged or rendered operative.

FIG. 9 also illustrates an alternative arrangement in which the pressure switch 60 is replaced by a motion or speed sensor 79. Furthermore, the pressure switch 60 may be associated with the fluid clutch 9 instead of the valve 11.

Turning now to FIG. 10, this shows a block diagram of the PTO electronic control module 63 which is based on a microprocessor 74 which may be a four-bit processor, for example. FIG. 10 illustrates that when the PTO switch 12 is actuated (turned ON), a signal is inputted to the microprocessor 74 which then initiates a timer 75 as well as outputting a signal to control means 76 which, when the timer 75 times out, will energise the solenoid 72 of the valve 11 which in turn will render operative or engage the PTO 7, assuming all conditions have been satisfied as will be described. When the switch 12 is deactuated (turned OFF), a signal is received by the microprocessor 74 and this initiates a further timer 77 which is connected to control means 78 which also receives an output from the hydraulic valve 11 more particularly, the pressure sensor 60. As will be described, if the timer 77 times out and there is an indication that the PTO is still operative, then the fuel valve 69 is closed and the engine 71 rendered inoperative. A further timer 70 is provided for timing the duration between the first, momentary, signal generated on initial rotation of the rotary member 41 of the switch 12, and the second signal generated on full rotation of the rotary member to the ON position of the switch.

Figure 11A:
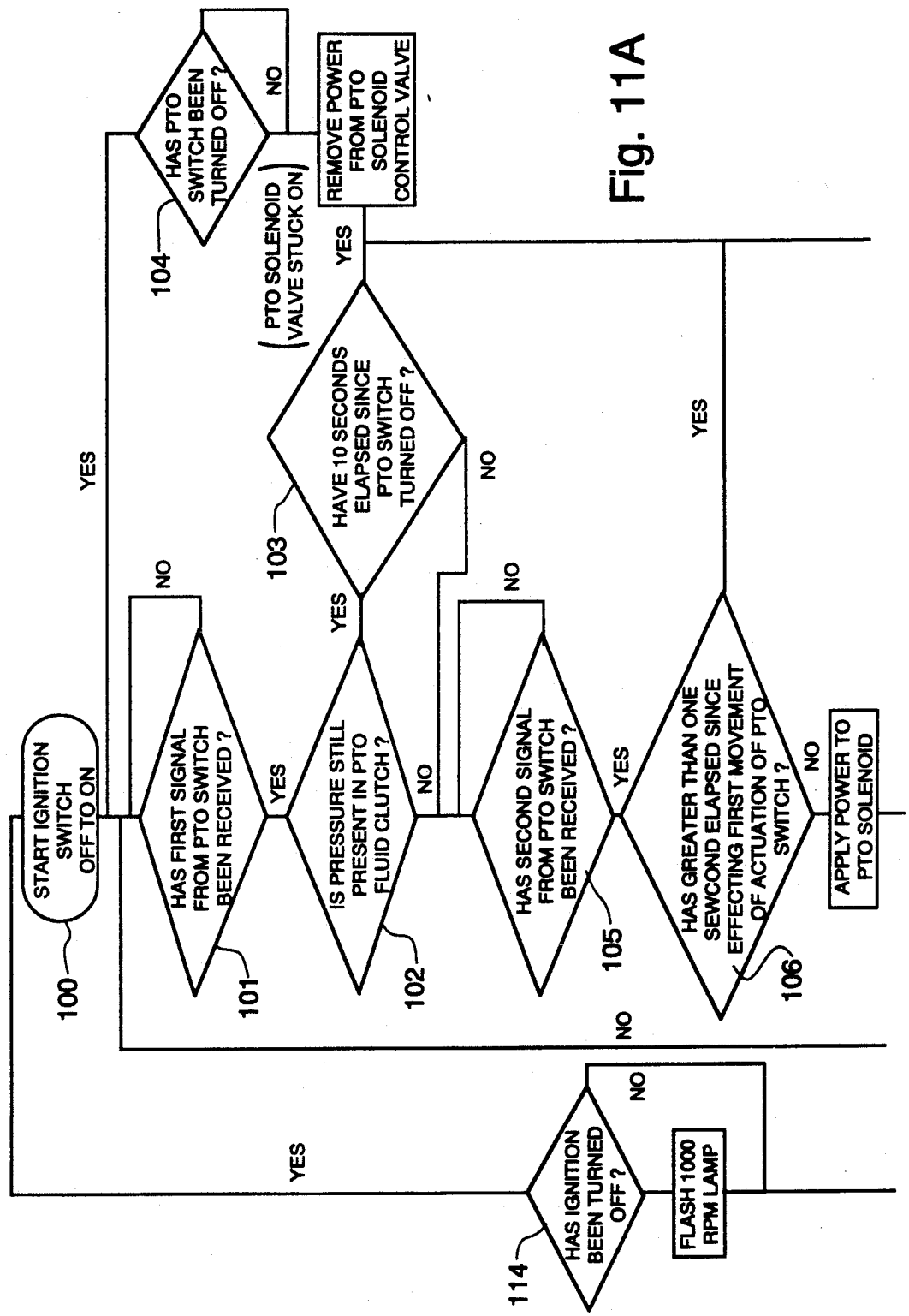
FIGS. 11A and 11B are flow diagrams illustrating a program of operation of the control system of FIG. 9.
Figure 11B:
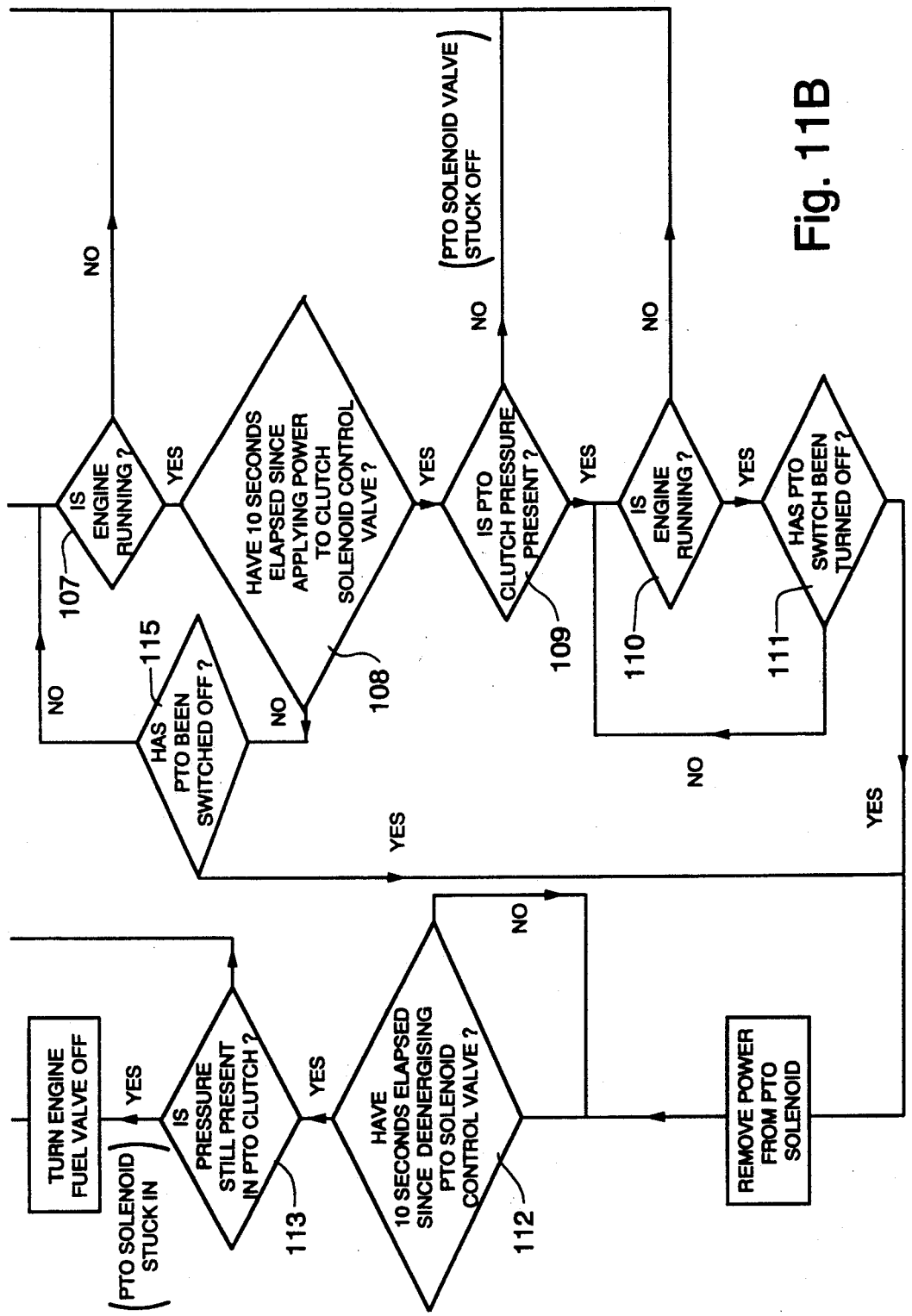

FIGS. 11A and 11B are flow diagrams illustrating the programme of operation of the overall interlock system for the PTO drive. The programme starts at step 100 with the turning of the engine ignition switch from OFF to ON. With the engine ignition ON, the microprocessor 74 samples the PTO actuation switch 12 and at step 101 checks whether the first, momentary signal has been generated by actuation of the switch 12 and if not, continually executes this checking step. If the first signal has been generated, then the microprocessor 74 checks at step 102 whether there is fluid pressure present in the PTO valve 11, this check being made by sampling the output signal from the pressure sensor 65. If pressure is present in the valve 11, i.e. clutch 9 is engaged, this could be as a result of the PTO drive being actuated very shortly after having been deactuated so that residual pressure might be in the valve 11 for this reason. Accordingly, at step 103, the microprocessor 74 checks whether a period of 10 seconds has elapsed since the switch 12 was last deactuated. If this time period has not elapsed, the microprocessor 74 moves to step 105 but if at the end of the 10 second time period there is still pressure present in the valve 11, the microprocessor 74 outputs a signal to remove power from the solenoid 72 of the valve 11 controlling operation of the PTO clutch 9. The microprocessor 74 then checks at steps 104 whether the switch 12 has been deactuated and if not, continually executes this check until the switch has been deactuated, whereupon it returns to step 101 to check for the next initiation of actuation of the PTO drive.

Following steps 103 and 104, step 105 is carried out at which the microprocessor 74 samples whether the switch 12 has been actuated further to generate the second signal and if not, continually executes this check. If the second signal is detected, the microprocessor 74 checks at step 106 whether more than one second has elapsed since the first signal was detected. If greater than one second has elapsed, the microprocessor 74 outputs a signal to de-energise the solenoid of the clutch control valve 11 and then executes step 104 as discussed above. Thus step 106 prevents engagement of the PTO 7, whether inadvertent or otherwise if the full actuation of the switch 12 is not accomplished quickly. In other words, the operator cannot generate the first signal of actuation and then wait longer than one second before generating the second signal of actuation although with the illustrated switch 12, the torsion spring 47 would in any event automatically reset the switch to OFF if the knob 27 were released after the generation of the first signal and before the generation of the second signal. If the second signal is detected within the one second period allowed, following detection of the first signal, the microprocessor 74 allows the solenoid of the control valve 11 to be energised and then checks at step 107 whether the engine is still running by checking whether there is a tacho signal on line 65.

If the engine has stopped, then again the microprocessor 74 outputs a signal to de-energise the solenoid of the control valve 11 and step 104 is executed as described above. If the engine is still running, the microprocessor 74 checks at step 108 whether 10 seconds have elapsed since energising the solenoid 72 of the control valve 11, this period of time being allowed in order to accommodate any slow pressurisation of the valve 11 in cold conditions. If this period of time has not elapsed, the microprocessor 74 continually executes steps 107 and 108 until it has, whereupon the microprocessor 74 checks at step 109 whether there is pressure present in the valve 11. If no pressure is detected, this indicates that there is a system failure such as, for example, the control valve 11 being stuck in the OFF position, whereupon the microprocessor 74 again outputs a signal to de-energise the solenoid 72 of the valve 11 and executes step 104 as before. If pressure is detected in the valve 11, the microprocessor 74 carries out step 110 to check again whether the engine 71 is running and if not, de-energises the control valve 11 and executes step 104. If the engine 71 is still running the microprocessor 74 checks at step 111 if the PTO drive has been deactuated by the switch 12 and if not, continually executes steps 110 and 111.

If the microprocessor 74 detects that the switch 12 has been deactuated, then it outputs a signal to remove power from the solenoid 72 of the control valve 11 and at step 112 checks whether 10 seconds have elapsed since removing this power to allow time for any residual pressure in the valve 11 to dissipate. If this period of time has not elapsed, step 112 is continually executed until the time period has elapsed, whereupon the microprocessor 74 checks at step 113 whether pressure is still present in the valve 11. If no pressure is present, then the processor returns to step 101. If pressure is still present in the valve 11, this indicates that the PTO drive is still operative, i.e. that the system has failed, perhaps by virtue of the valve 11 being stuck in the ON position, which is potentially hazardous, whereby the microprocessor 74 outputs a signal to interrupt the flow of fuel from the fuel control valve 69 to the tractor engine 71, at the same time energising the warning lamp 68 in the cab 3. The microprocessor 74 then checks at step 114 whether the engine ignition has been tuned OFF and if so, returns to step 100. If the engine ignition has not been turned off, it continually executes step 114, maintaining energised the warning lamp 68 in the operators cab. If the engine 71 has been switched off, it can be switched on again but the PTO drive 7 will be actuated and the lamp 68 will flash, thus reminding the operator of system failure. This allows the operator to drive the tractor to a service point to rectify the fault, should it not be possible to service the tractor on site, this is known as the "limp home" condition.

Returning to step 108, if the 10 second period has not elapsed since energising the solenoid 72 of the control valve 11, the microprocessor 74 checks at step 115 whether the PTO drive has been deactuated by the switch 12 and if not, continually executes the steps 107 and 108 as already explained. If the microprocessor 74 detects that the PTO actuation switch 12 has been deactuated, then control is carried out as already described following step 111, i.e. fuel to the engine is interrupted and a warning light energised in the cab.

It will be seen that steps 107, 108 and 115 and steps 110 and 111 ensure that the PTO drive 7 is deactuated when the engine 71 is switched off even if the PTO switch 12 remains in the ON position. Furthermore, when the engine 71 is next switched on the PTO 7 will not be actuated even though the switch may still be in the ON position because the first and second signals will not have been generated by the switch. Thus, it is not until the switch 12 is first moved to the OFF position and then to the ON position that the PTO 7 can be actuated. Therefore, when the ignition is off, the PTO is always electrically disengaged.

Figure 12A:
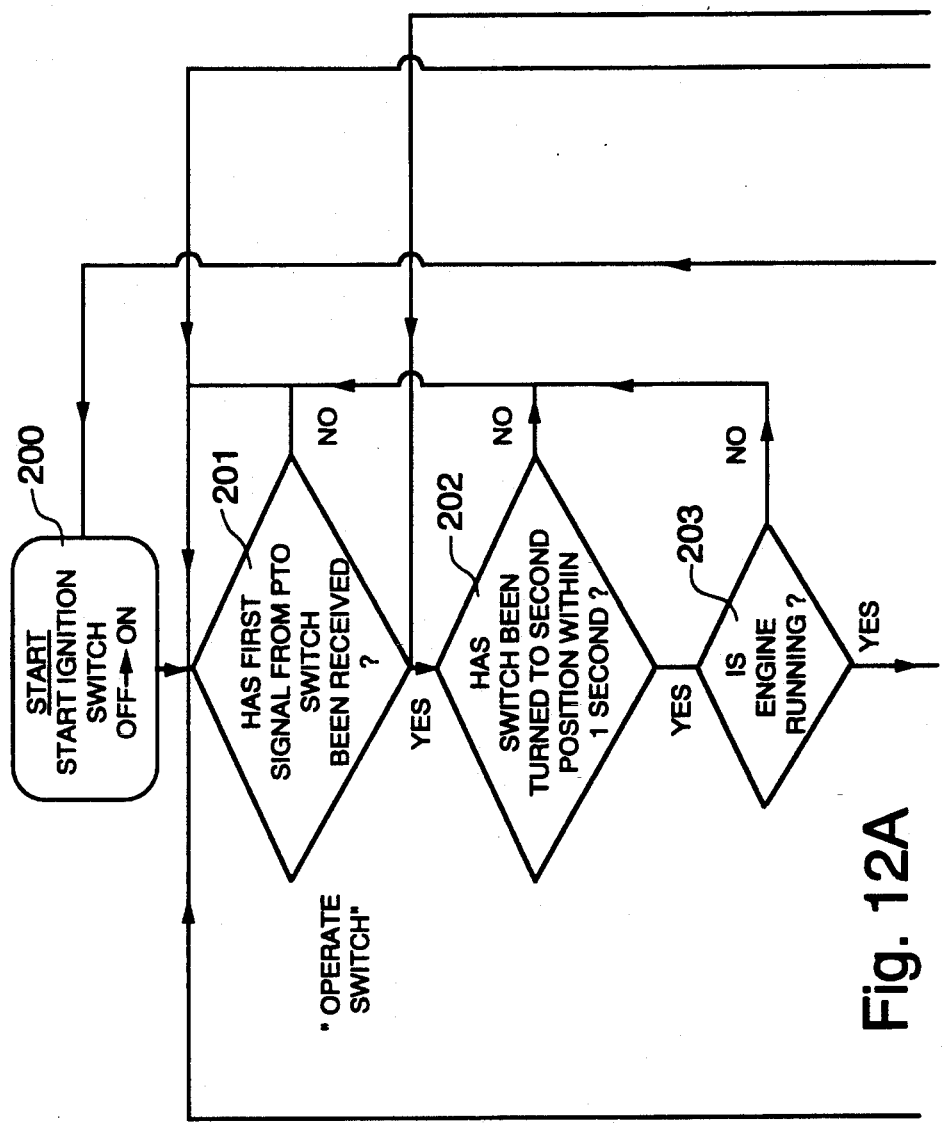
FIGS. 12A and 12B are alternative flow diagrams illustrating a program of operation of the control system of FIG. 9.
Figure 12B:
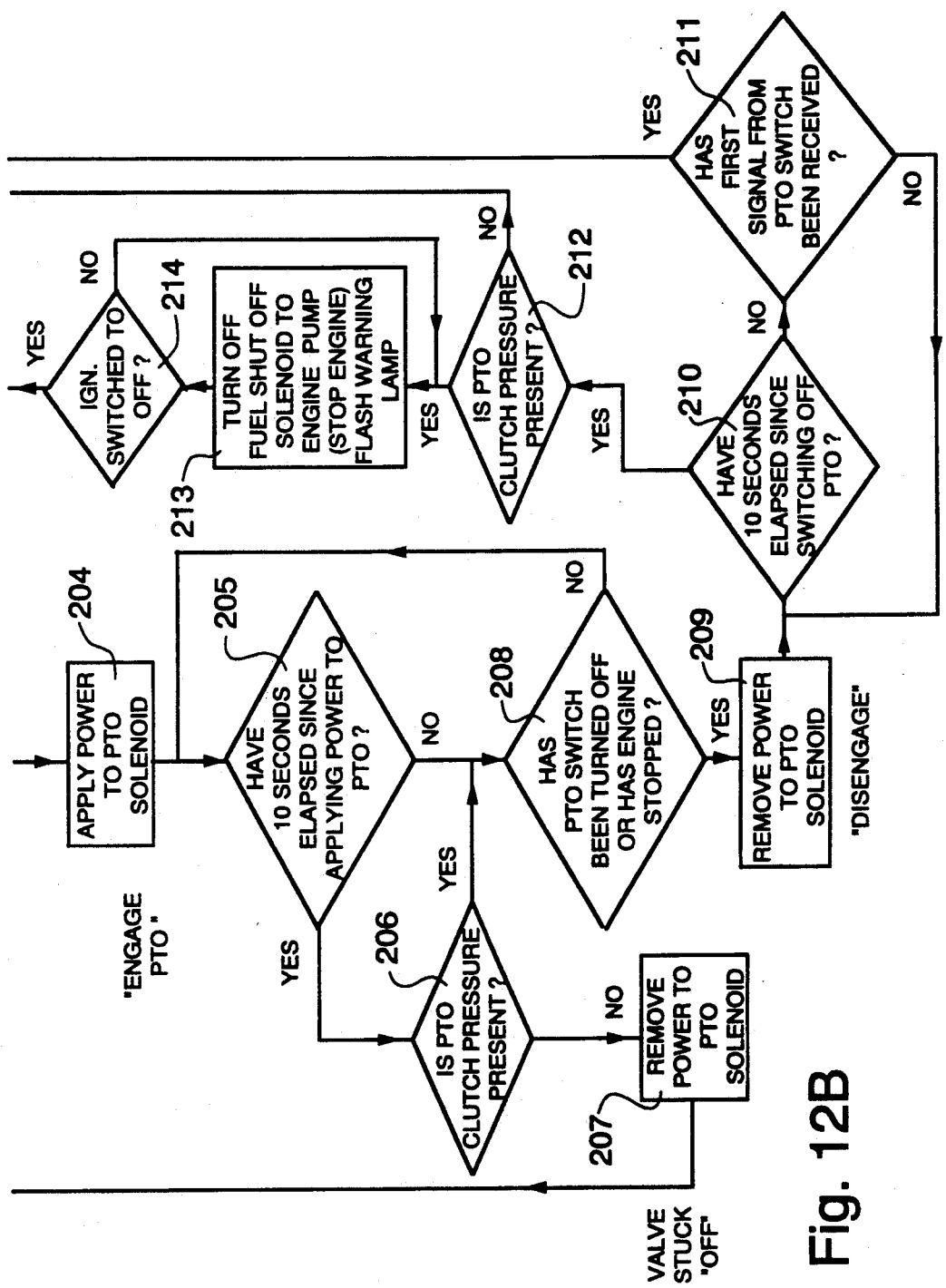

FIGS. 12A and 12B are flow diagrams illustrating an alternative programme of operation of the overall interlock system for the PTO drive. This alter programme achieves the same effect of that of FIGS. 11A and 11B and starts at step 200 with the turning of the engine ignition switch from OFF to ON. With the engine ignition ON, the microprocessor 74 samples the PTO actuation switch 12 and at step 201 checks whether the first, momentary signal has been generated by actuation of the switch 12 and if not, continually executes this checking step. If the first signal from the switch 12 has been generated, then the microprocessor 74 checks at step 202 whether the switch 12 has been turned to its second position to generate the second signal within one second of generating the first signal. If this condition is satisfied, the microprocessor 74 then checks at step 203 whether the engine is running and if so, it applies power to the PTO solenoid, i.e. the solenoid of the clutch control valve 11. If at step 202 the second signal is not generated within one second of generating the first signal, then the programme returns to step 201 and continues circulating until the condition at step 202 is satisfied. If at step 203 the engine is found not to be running, then the programme returns to step 201 and circulates around steps 201, 202 and 203 until all of the necessary conditions are satisfied.

Assuming power has been applied to the solenoid of the clutch control valve 11 at step 204, the microprocessor 74 next checks at step 205 whether ten seconds have elapsed since applying power to the PTO solenoid. If this condition is satisfied, the microprocessor 74 checks at step 206 whether clutch pressure is present in the control valve 11 and if not, the solenoid of the clutch control valve is de-energised at step 207 and the programme returns to step 201. This condition indicates that the clutch control valve 11 is stuck in the OFF position. As before, the ten second period at step 205 is employed to ensure that the control valve 11 has sufficient time to come upto pressure in all operating environments.

If the check at step 205 shows that the necessary ten second period has not elapsed, then the microprocessor 74 checks at step 208 whether the PTO switch or the engine ignition switch have been turned to the OFF position. If neither of these switches have been turned OFF, then the programme goes back to 205 and circulates between steps 205 and 208 or steps 205, 206 and 208, as appropriate.

If the check at step 208 shows that the PTO or the engine has been switched OFF, then the solenoid of the clutch control valve 11 is de-energised at step 209. Microprocessor 74 then checks at step 210 whether ten seconds have elapsed since switching OFF the PTO and if not, a check is made at step 211 as to whether the first, momentary signal has been received from the switch 12. If this signal has been received, then the programme goes to step 202 and follows the routines already described. If the first signal has not been received from the switch 12, then the programme returns to step 210. If the check at step 210 shows that ten seconds have elapsed since the PTO was switched OFF then the microprocessor checks at step 212 whether clutch pressure is still present and if it is, it turns OFF the fuel shut-off solenoid to the engine pump and flashes a warning light in the cab. This is because the clutch control valve 11 has stuck in the ON position. The microprocessor 74 then checks at step 214 whether the ignition switch has been turned to the OFF position and if it has, the programme returns to the initial step 200. If the ignition switch has not been turned OFF, the programme returns to step 213. If the check at step 212 shows that there is no PTO clutch pressure present, then the programme returns to step 201.

It will be seen that the present invention provides an interlock system for the PTO drive having one or more of the following features:
1. The PTO drive cannot be actuated if two distinct movements of initial actuation are not carried out within a predetermined time period.
2. The PTO drive is deactuated if, after a predetermined time period following an attempted actuation, a sensed parameter of the PTO drive is indicative of the drive having remained inoperative.
3. Once the PTO drive has been deactuated, a check is made to see whether the PTO drive is in fact still operative and if it is, and a predetermined time period has elapsed, then the primary drive of the apparatus, be it tractor or other apparatus, is interrupted and a warning given to the operator.
4. If the PTO switch is left in the ON position when the primary drive is rendered inoperative, the PTO drive is not actuated when the primary drive is reestablished, i.e. the PTO is always electrically disengaged when the primary drive is inoperative.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In an apparatus fitted with a power take-off drive connectable to ancillary equipment and means for actuating and deactuating the power take-off drive, an interlock system comprising:
sensor means for sensing whether the power take-off drive is operative and producing an output signal representative thereof;
timer means coupled to the actuating and deactuating means and initiated when said means for actuating and deactuating the power take-off drive is operated; and
means responsive to the sensor output signal and coupled to the timer means and operable to produce a deactuating signal in response to a sensor output signal indicating the power take-off drive is inoperative when the timer times out, the deactuating signal being applied to a selected component of the apparatus to deactuate that component.

2. In an apparatus fitted with a power take-off drive connectable to ancillary equipment and means for actuating and deactuating the power take-off drive, an interlock system comprising:
sensor means for sensing whether the power take-off drive is operative and producing an output signal representative thereof;
timer means coupled to the actuating and deactuating means and initiated when the actuating and deactuating means is operated to actuate the power take-off drive; and
means responsive to the sensor output signal and coupled to the timer and operable to deactuate the actuating and deactuating means if the power take-off drive is not operative when the timer times out.

3. In an apparatus fitted with a power take-off drive drivable by primary drive means for the apparatus and connectable to ancillary equipment, and means for actuating and deactuating the power take-off drive, an interlock system comprising:
sensor means for sensing whether the power take-off drive is operative and producing an output signal representative thereof;
timer means coupled to the actuating and deactuating means and initiated when the actuating and deactuating means is operated to deactuate the power take-off drive; and
control means responsive to the sensor output signal and coupled to the timer means and operable to deactuate the primary drive if the power take-off is still operative when the timer times out.

4. The apparatus according to claim 3 wherein the sensor means is a pressure sensor associated with the means for actuating and deactuating the power take-off drive.

5. The apparatus according to claim 3 wherein the sensor means is a motion or speed sensor operable to sense the motion or speed of the power take-off drive.

6. The apparatus according to claim 5 wherein the actuating and deactuating means is in the form of a fluid clutch controlled by a solenoid-controlled hydraulic valve.

7. The apparatus according to claim 5 wherein the primary drive means is an internal combustion engine, the control means responsive to the sensor output signal and coupled to the timer controlling a fuel supply valve for the engine.

8. The apparatus according to claim 7 further comprising indicator means operable to indicate when the primary drive means is deactuated.

9. The apparatus according to claim 8 wherein the interlock system allows the primary drive to be reactuated when the primary drive has been deactuated by the control means.

10. In an apparatus fitted with a power take-off drive connectable to ancillary equipment and means for initiating the actuation and deactuation of the power take-off drive, the initiating means requiring distinct first and second movements of actuation to render the power take-off drive operative, an interlock system comprising:
timer means initiated when a first signal indicative of intended actuation of the power take-off drive is detected; and
means coupled to the timer means and responsive to a second signal confirming intended actuation of the power take-off drive and operable to deactuate the power take-off drive if the timer means times out before said second signal is detected.

11. The apparatus according to claim 10 wherein the power take-off initiation means includes electrical switch means, an operating member of the switch means having first to be subjected to one type of movement and then subjected to a second type of movement, different form the first, in order to complete actuation of the switch means to render the power take-off drive operative.

12. In an apparatus fitted with a power take-off drive drivable by primary drive means for the apparatus and connectable to ancillary equipment, means for actuating and deactuating the power take-off drive and switch means for controlling the actuating and deactuating means, an interlock system comprising:

first sensor means for sensing whether the primary drive means is operative and producing a first output signal representative thereof;

second sensor means for sensing whether the power take-off drive is operative and producing a second output signal representative thereof; and means responsive to the first and second signals and operable to deactuate the power take-off drive via the actuating and deactuating means when the second signal is present and the first signal is absent, which corresponds to the primary drive means being inoperative and the switch means is in an ON position.

13. The apparatus according to claim 12 further comprising means for maintaining the power take-off drive deactuated until the switch means is first moved to an OFF position and then moved to the ON position.

* * * * *